United States Patent
Li et al.

(10) Patent No.: US 11,865,784 B2
(45) Date of Patent: Jan. 9, 2024

(54) LIGHT-CURING PRINTER DISPLAY DEVICE, 3D PRINTER, CONTROL METHOD AND DEVICE, AND ELECTRONIC DEVICE

(71) Applicant: Shanghai Fusion Tech Co., Ltd., Shanghai (CN)

(72) Inventors: Jianzhe Li, Shanghai (CN); Kaijian Ni, Shanghai (CN); Zongmou Yang, Shanghai (CN)

(73) Assignee: SHANGHAI FUSION TECH CO., LTD., Shanghai (CN)

( * ) Notice: Subject to any disclaimer, the term of this patent is extended or adjusted under 35 U.S.C. 154(b) by 0 days.

(21) Appl. No.: 17/446,320

(22) Filed: Aug. 30, 2021

(65) Prior Publication Data
US 2023/0024487 A1  Jan. 26, 2023

(30) Foreign Application Priority Data

Jul. 23, 2021  (CN) .......................... 202110828290.9

(51) Int. Cl.
| | |
|---|---|
| *B29C 64/282* | (2017.01) |
| *B33Y 30/00* | (2015.01) |
| *B29C 64/286* | (2017.01) |
| *B29C 64/264* | (2017.01) |
| *B33Y 40/20* | (2020.01) |

(52) U.S. Cl.
CPC .......... *B29C 64/282* (2017.08); *B29C 64/264* (2017.08); *B29C 64/286* (2017.08); *B33Y 30/00* (2014.12); *B33Y 40/20* (2020.01)

(58) Field of Classification Search
CPC ... B29C 64/153; B29C 64/264; B29C 64/277; B29C 64/282; B29C 64/291; B29C 64/286; B22F 3/1055; B22F 2003/1056; B22F 2003/1057; B22F 2003/1058; B22F 2003/1059; B22F 10/20
See application file for complete search history.

(56) References Cited

U.S. PATENT DOCUMENTS

2012/0063131 A1\*  3/2012  Jamar ................... B29C 64/286
362/235

FOREIGN PATENT DOCUMENTS

CN  208164309 U  \* 11/2018

\* cited by examiner

*Primary Examiner* — Philip C Tucker
*Assistant Examiner* — Jimmy R Smith, Jr.
(74) *Attorney, Agent, or Firm* — Avek IP, LLC

(57) ABSTRACT

Disclosed are light-curing printer display devices, 3-dimensional (3D) printers, control methods and devices, and electronic devices. In some embodiments, the light-curing printer display device include a screen, a light source assembly, a shielding plate, and a controller. In other embodiments, the light source assembly is arranged on a back side of the screen and the light source assembly includes multiple Light Emitting Diode (LED) light sources independent of each other. The shielding plate is arranged between the screen and the light source assembly and is provided with multiple light holes with the same number as that of the multiple LED light sources. The multiple light holes correspond to the multiple LED light sources one by one. The controller is electrically connected with the multiple LED light sources and is configured to control at least one LED light source to emit light.

11 Claims, 9 Drawing Sheets

LIGHT-CURING PRINTER DISPLAY DEVICE, 3D PRINTER, CONTROL METHOD AND DEVICE, AND ELECTRONIC DEVICE

CROSS REFERENCE TO RELATED APPLICATIONS

This application claims priority to Chinese application number 202110828290.9, filed on Jul. 23, 2021, the disclosure of which is incorporated by reference herein in its entirety.

FIELD OF THE DISCLOSURE

The disclosure relates generally to printer displays. More specifically, the disclosure relates to light-curing printer display devices, 3-dimensional (3D) printers, control methods and devices, and electronic devices.

BACKGROUND

An ultraviolet light source used by a light-curing printer refers to irradiation of a single and extensive high-power ultraviolet lamp source. Although a Light Emitting Diode (LED) light source has high directivity, there are still a few light sources passing through within a wide-angle range. As a result, the exposure quality is influenced. Regarding the problem that the exposure quality is poor in the prior art, no effective solution has been proposed yet so far.

SUMMARY

The following presents a simplified summary of the invention to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a light-curing printer display device including a screen, a light source assembly, a shielding plate, and a controller. The light source assembly is arranged on a back side of the screen. The light source assembly includes multiple Light Emitting Diode (LED) light sources independent of each other. The shielding plate is arranged between the screen and the light source assembly. The shielding plate is provided with multiple light holes with the same number as that of the multiple LED light sources. The multiple light holes correspond to the multiple LED light sources one by one. The controller is electrically connected with the multiple LED light sources. The controller is configured to control at least one LED light source to emit light.

Optionally, the light source assembly has a shape selected from the group consisting of a rectangle, a rhombus, a circle, and a triangle.

Optionally, the at least one LED light source is configured to: receive a content to be displayed; determine an area of the screen to be exposed according to the content to be displayed; determine a control instruction by referring to the area of the screen to be exposed; and control the at least one LED light source to emit light according to the control instruction.

Optionally, a diameter of the light hole is $$\frac{H1}{H} \times 2R.$$

Here, H1 is a distance between an upper surface of the shielding plate and the multiple LED light sources; H is a distance from the multiple LED light sources to the screen; and R is a radius of a round light spot projected by an LED light source through the light hole. In addition, following constraint condition is satisfied:

$$H1 < \frac{\sqrt{3}}{2}H.$$

Optionally, a distance between two adjacent light holes or two adjacent LED light sources is $\sqrt{3}R$.

Optionally, the light source assembly has a rectangular shape, and the light source assembly may include twenty-two LED light sources independent of each other.

In other embodiments, the disclosure provides a 3-dimensional (3D) printer, including the light-curing printer display device mentioned above.

In further embodiments, the disclosure provides a zone-controllable control method including the following steps: (1) receiving a content to be displayed; (2) determining an area of a screen to be exposed according to the content to be displayed; (3) determining a control instruction by referring to the area of the screen to be exposed; and (4) controlling at least one Light Emitting Diode (LED) light source to emit light according to the control instruction.

Optionally, the disclosure provides an electronic device including a memory and a processor. The memory stores a computer program therein; and the processor is configured to run the computer program to execute the above zone-controllable control method.

In some embodiments, the disclosure provides a zone-controllable control device including a receiving module, an area determination module, an instruction determination module, and a control module. The receiving module is configured to receive a content to be displayed. The area determination module is configured to determine an area of a screen to be exposed according to the content to be displayed. The instruction determination module is configured to determine a control instruction by referring to the area of the screen to be exposed. The control module is configured to control at least one Light Emitting Diode (LED) light source to emit light according to the control instruction.

BRIEF DESCRIPTION OF THE DRAWINGS

Illustrative embodiments of the present disclosure are described in detail below with reference to the attached drawing figures.

DETAILED DESCRIPTION

Figure 1:
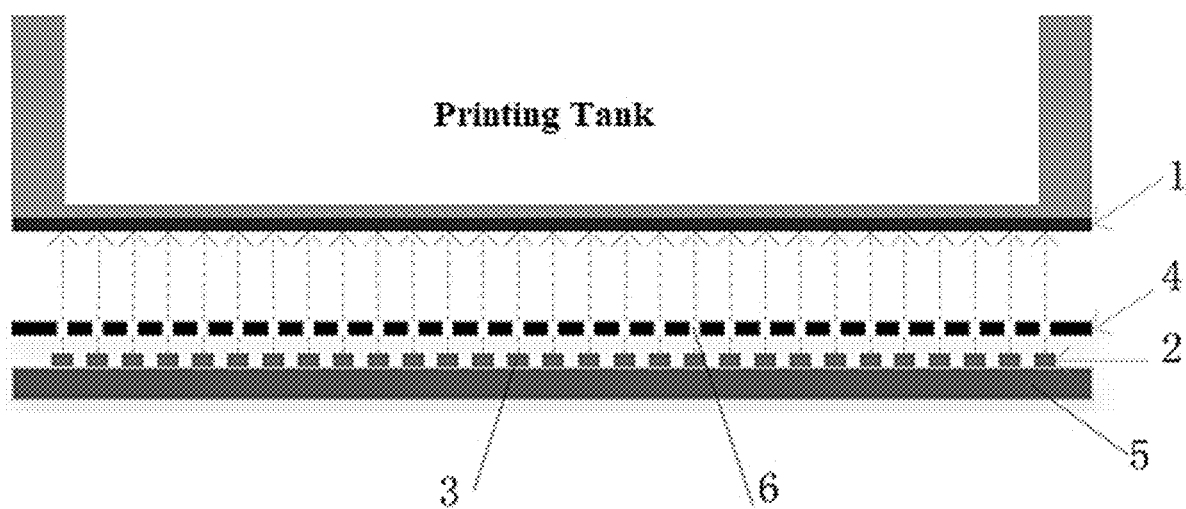
FIG. 1 is a structure diagram illustrating a light-curing printer display device according to an embodiment of the disclosure.

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

It is to be noted that terms "first", "second" and the like in the description, claims and the above-mentioned drawings of the application are used for distinguishing similar objects rather than describing a specific sequence or a precedence order. It should be understood that the data used in such a way may be exchanged where appropriate, in order that the embodiments of the application described here can be implemented. In addition, terms "include" and "have", and any variations thereof are intended to cover non-exclusive inclusions. For example, it is not limited for processes, methods, systems, products, or devices containing a series of steps or units to clearly list those steps or units, and other steps or units which are not clearly listed or are inherent to these processes, methods, products, or devices may be included instead.

In the application, orientation or position relationships indicated by terms "upper", "lower", "left", "right", "front", "back", "top", "bottom", "inside", "outside" "in", "vertical", "horizontal", "transverse", "longitudinal" and the like are orientation or position relationships shown in the drawings. These terms are mainly used to better describe the application and its embodiments, rather than limit that the indicated devices, components and constituting parts must be in specific orientations or structured and operated in the specific orientations.

Furthermore, the above-mentioned part of terms may be not only used to represent the orientation or position relationships, but used to represent other meanings, for example, term "on" may be used to represent certain relationship of dependence or connection relationship in some cases. For those of ordinary skill in the art, specific meanings of these terms in the application may be understood according to a specific condition.

In addition, terms "mount", "configure", "provide", "connect", "link" and "sleeved" should be broadly understood. For example, the term "connect" may be fixed connection, detachable connection, or integral construction. As an alternative, the term "connect" may be mechanical connection, or electrical connection. As an alternative, the term "connect" may be direct connection, or indirect connection through a medium, or communication in two devices, components or constituting parts. For those of ordinary skill in the art, specific meanings of the above-mentioned terms in the disclosure may be understood according to a specific condition.

As shown in FIGS. 1-7, the disclosure illustrates multiple embodiments of light-curing printer display devices. As shown in FIG. 1, a display device may include: a screen 1, a shielding plate 4, and a controller 5. A light source assembly 2 is arranged on a back side of the screen 1 and includes multiple LED light sources 3 independent of each other. The shielding plate 4 is arranged between the screen 1 and the light source assembly 2. The shielding plate 4 is provided with multiple light holes 6 with the same number as that of the LED light sources 3 thereon. The multiple light holes 6 correspond to the multiple LED light sources 3 one by one. The controller 5 is electrically connected with the multiple LED light sources 3 independent of each other and is configured to control at least one LED light source 3 to emit light.

The screen 1 plays a role of displaying a corresponding content upon light projection, and the light source assembly 2 plays a role of projecting the light to the screen 1. In the embodiment, the light source assembly 2 includes the multiple LED light sources 3 independent of each other, and each LED light source 3 may emit light independently, and the shielding plate 4 plays a role of shielding light. The light from the LED light source 3 may be shielded through the shielding plate 4. This way, the light may be projected to the screen 1 only through the light hole 6 on the shielding plate 4, and the light that is not needed is therefore shielded. As a result, the light source boundary may be more distinct, and accordingly, the exposure quality may be effectively improved. In addition, the light hole 6 may control an area of a round light spot formed by projection of the light from the LED light source 3 within a rated value. This way, an area of an overlapping area between two adjacent round light spots may become controllable.

In order to minimize the overlapping area between the round light spots formed by projection of the two adjacent LED light sources 3 as far as possible on the premise that there is no aphotic gap, the overlapping area may be correspondingly designed. Optionally, the diameter of the light hole 6 may be $$\frac{H1}{H} \times 2R.$$

Here, H1 is a distance between an upper surface of the shielding plate 4 and the LED light source 3, H is a distance from the LED light source 3 to the screen 1, R is the radius of the round light spot projected by the LED light source 3 through the light hole 6, and a constraint condition is satisfied:

$$H1 < \frac{\sqrt{3}}{2} H.$$

Figure 5:
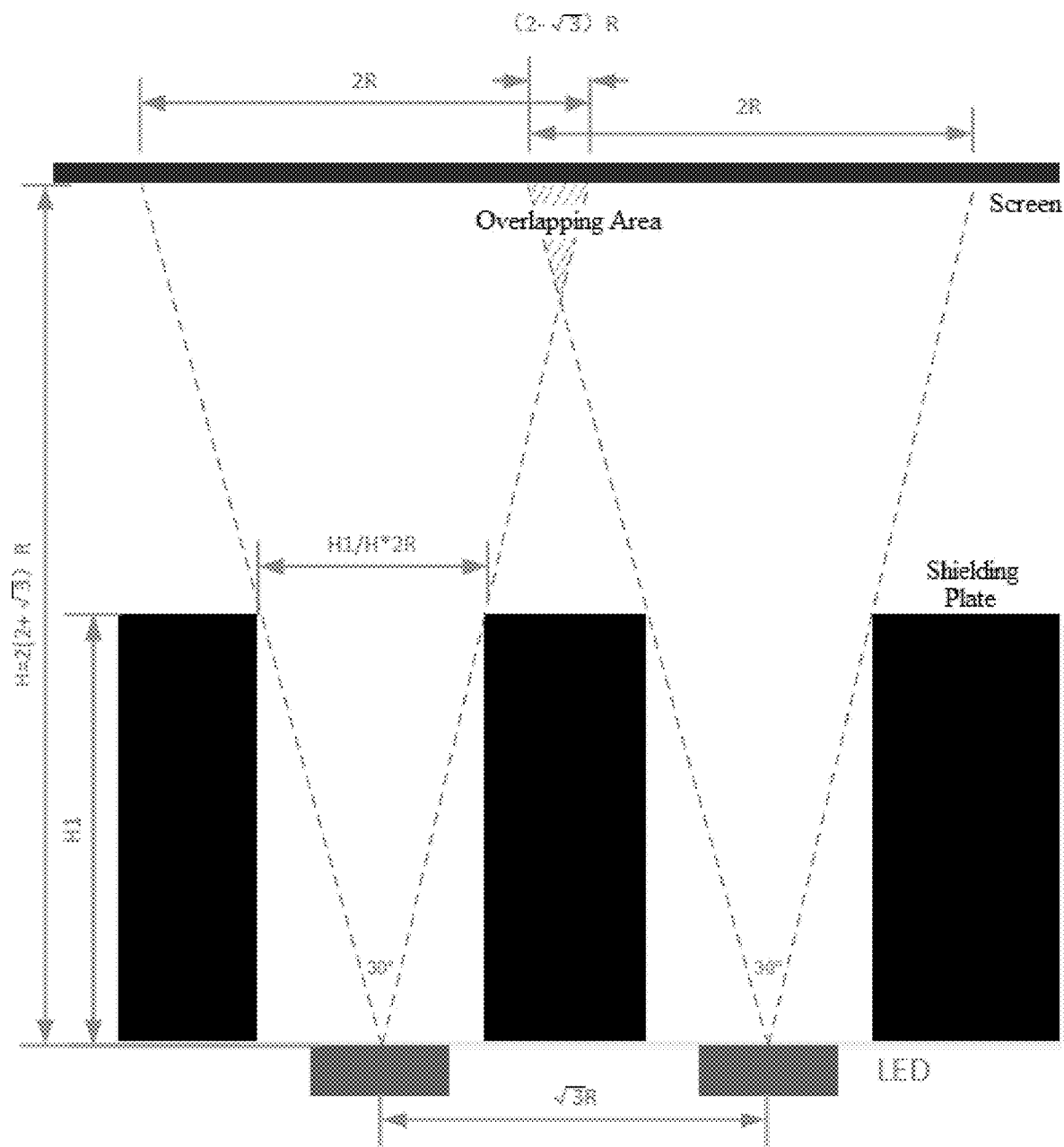
FIG. 5 is a lateral schematic diagram illustrating an illuminating path according to an embodiment of the disclosure.

Optionally, a distance between two adjacent light holes 6 or two adjacent LED light sources 3 is VR. If there is no overlapping area, because the light spot projected by the LED light source 3 is round, the aphotic gap will inevitably occur between the two adjacent round light spots during splicing of the light spots. Thus, the overlapping area is inevitably needed, as to guarantee that there is no aphotic gap. Based on this, a distribution shape shown in FIG. 4 may be arranged. Assuming that the radius of the round light spot is R and the range±15° (a total of 30°) of the LED light source 3 may be an effective incidence part, a length of the overlapping area along an axial direction of two light beads may be $(2-\sqrt{3})R$. FIG. 5 shows a lateral schematic diagram of an illuminating path, an interval between the LED light sources 3 is $\sqrt{3}R$, a distance H from an LED light to the screen 1 is $2(2-\sqrt{3})R$. The distance from the upper surface of the shielding plate 4 to the LED light source 3 may be set to H1 in consideration of the thickness and the mounting condition of the shielding plate 4, and then the diameter of an opening of the shielding plate 4 is $$\frac{H1}{H} \times 2R.$$

The diameter of the opening of the shielding plate 4 may be less than the distance between the two LED light sources 3, so $$\frac{H1}{H} \times 2R < \sqrt{3}R,$$

namely, $$H1 < \frac{\sqrt{3}}{2}H.$$

The shielding plate 4 is designed and the LED light sources are arranged according to the above size constraints. This way, the overlapping area between the round light spots formed by projection of the two adjacent LED light sources 3 may be minimized as far as possible on the premise that there is no aphotic gap. Accordingly, the loss may be reduced, and the service life may be prolonged.

In some embodiments, with a shielding mode, an objective of greatly minimizing the overlapping area between the round light spots may be achieved by projection of the two adjacent LED light sources 3 through the screen 1, the light source assembly 2, arranged on the back side of the screen 1 and including the multiple LED light sources 3 independent of each other, the shielding plate 4, arranged between the screen 1 and the light source assembly 2 and provided with the multiple light holes 6 with the same number as that of the LED light sources 3 thereon, the multiple light holes 6 corresponding to the multiple LED light sources 3 one by one, and the controller 5, electrically connected with the multiple LED light sources 3 independent of each other and configured to control the at least one LED light source 3 to emit light on the premise that there is no aphotic gap. This way, the technical effect of reducing the loss and prolonging the service life may be achieved, and accordingly, the technical problem that the loss is great and the service life is short may be solved.

Optionally, the light source assembly 2 may be in the form of a rectangle, a rhombus, a circle, or a triangle including the multiple LED light sources 3 independent of each other. By referring to the above design of the shielding plate 4, the multiple LED light sources 3 independent of each other may be arranged in different shapes, for example, the rectangle, the rhombus, the circle, or the triangle.

Optionally, the at least one LED light source 3 emits light. Such a process may include the following steps: a content to be displayed is received; an area of the screen to be exposed is determined according to the content to be displayed; a control instruction is determined by referring to the area to be exposed; and the at least one LED light source 3 is controlled to emit light according to the control instruction.

Figure 6:
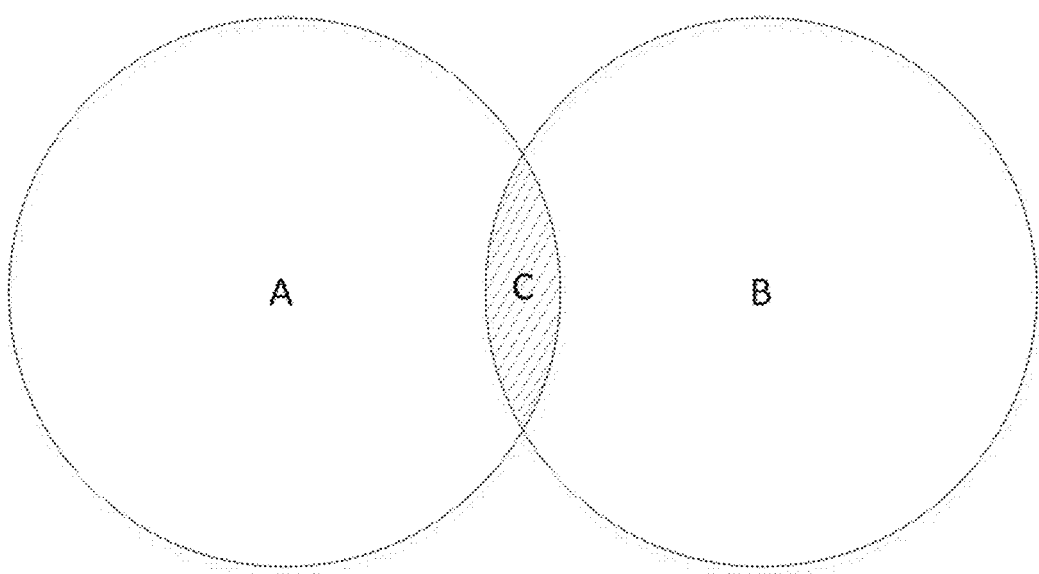
FIG. 6 is a schematic diagram illustrating an overlapping area according to an embodiment of the disclosure.

As for processing of the overlapping area, a zone control method may be taken to process. When there are two overlapping light spots, as shown in FIG. 6, assuming that non-overlapping parts are A and B respectively and an overlapping part is C. A, B and C are mutually disjoint ($A \cap B=0$, $A \cap c=0$, and $B \cap C=0$). A light spot D is defined as A+C, which corresponds to a light source D. A light spot E is defined as B+C, which corresponds to a light source E.

When an exposed area is positioned in the area A, the light source D emits light.

When the exposed area is positioned in the area B, the light source E emits light.

When the exposed area is positioned in the area A and the area B, the light source D and the light source E emit light synchronously.

When the exposed area is positioned in the area A and the area C, the light source D emits light.

When the exposed area is positioned in the area B, and the area C, the light source E emits light.

When the exposed area is positioned in the area C, only one of the light source D and the light source E emits light.

When the exposed area is positioned in the area A, the area B, and the area C, the light source D and the light source E emit light synchronously, and the screen 1 may be in a semi-opened semi-closed gray status. The gray status has different modes of implementation on the different screens 1 and may be implemented by controlling a liquid crystal status or implementing time division multiplexing.

Figure 2:
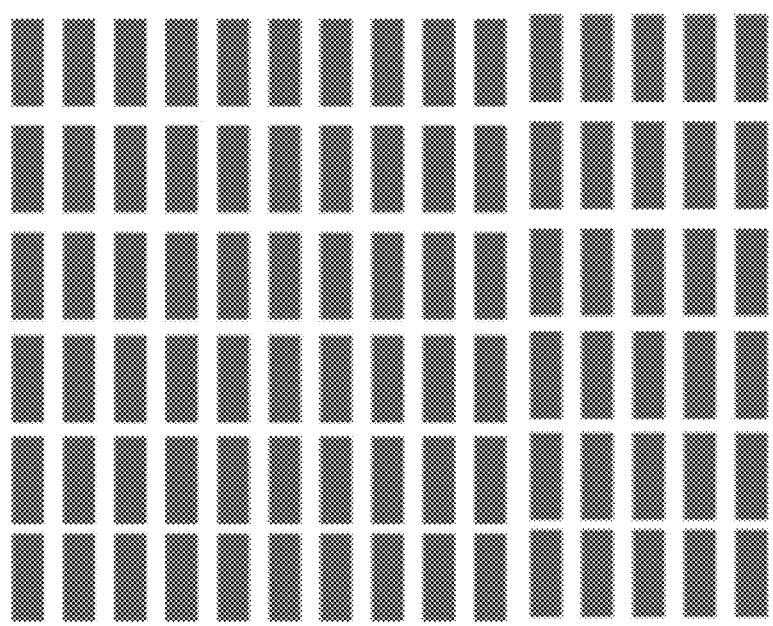
FIG. 2 is a structure diagram illustrating an independent light source assembly (a matrix) according to an embodiment of the disclosure.

The content to be displayed may include displayed point location information. By referring to the point location information, the area of the screen 1 to be exposed may be converted, and by referring to the area to be exposed, the control instruction may be determined (the control instruction may be determined by referring to the above situation). The above controlled lighting is controlled by the controller 5 according to the control instruction. Each LED light source 3 may be independently controlled with a programmable logic device or a dedicated control device 5 (the controller 5). The LED light sources 3 may be arranged in the form of a matrix, a rhombus, a circle, a triangle, and other shapes according to the actual need of a 3D printer. Because the screen 1 is presented as the rectangle so far, the LED light sources 3 are arranged in the form of the rectangle. The different light sources may be controlled according to the need of exposing an image. As shown in FIG. 2, the independent light source may be arranged in the form of the matrix by the LED light sources 3. When a brown V-like shape shown in FIG. 3 needs to be exposed, only the LEDs of a corresponding part under the V-like shape need to emit light, while other LEDs are kept in an OFF status. Not all LEDs are required to light up compared with the previous solutions. This way, fewer LEDs emit light, and less energy may be consumed. There is no light for irradiating the other parts on the screen 1 as well, and no heat will be generated by these parts. As a result, the temperature of the screen 1 may be reduced, the service life of the screen 1 may be prolonged, and the power consumption may be effectively reduced.

Optionally, the light source assembly 2 is in the form of a rectangle including 22 LED light sources 3 independent of each other.

Figure 7:
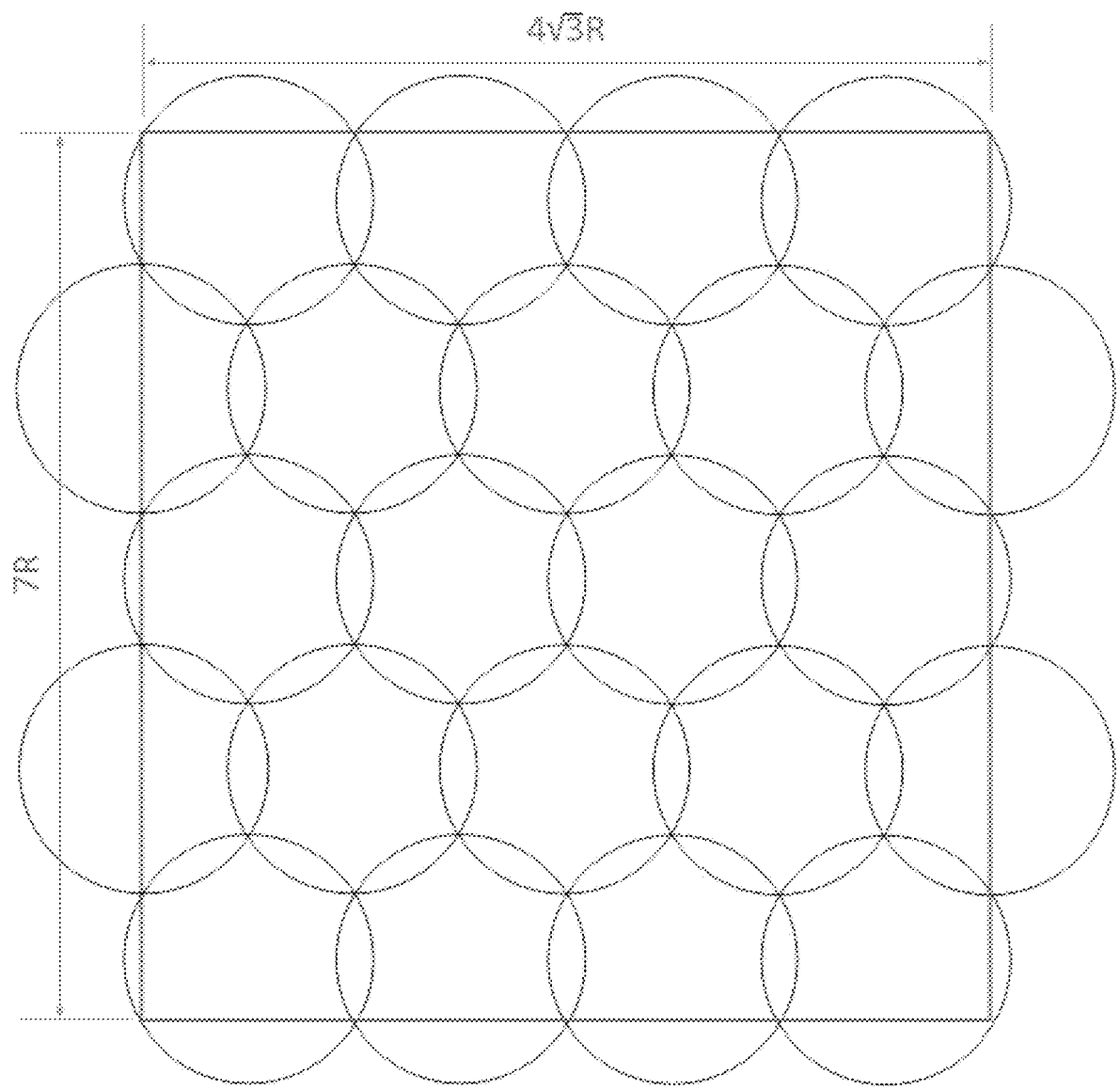
FIG. 7 is a light source distribution diagram illustrating a rectangle screen according to an embodiment of the disclosure.

The screen 1 is rectangle, but the light spot is round. The round light spot fits the rectangle screen 1, thereby increasing some losses. As shown in FIG. 7, there are 5 lines of light sources and 4-5 light sources in each line, namely, 22 light spots in total. The radius of the light spot is R, the total area of a light spot part is $$\left(\frac{17}{3}\pi + \frac{49\sqrt{3}}{2}\right)R^2,$$

a maximum rectangle is $7R \times 4\sqrt{3}R = 28\sqrt{3}R^2$, thus the effective rate of fitting is $$\frac{28\sqrt{3}R^2}{\left(\frac{17}{3}\pi + \frac{49\sqrt{3}}{2}\right)R^2} = 80.51\%.$$

Along with different fitting of the round light spot and the screen 1 in the form of the matrix, the fitting efficiency may be further adjusted.

Assuming that an average exposed area of each layer is 30% of a total area of the screen 1, without considering the difference between a central part and an edge part, and assuming that the illumination of the 30° area of the center is 60% of the light from the LED light source 3. On the basis of the consistent light source power consumption, the energy saved compared with previous modes may be: 1−30%÷80.51%÷60%=37.90%.

Figure 8:
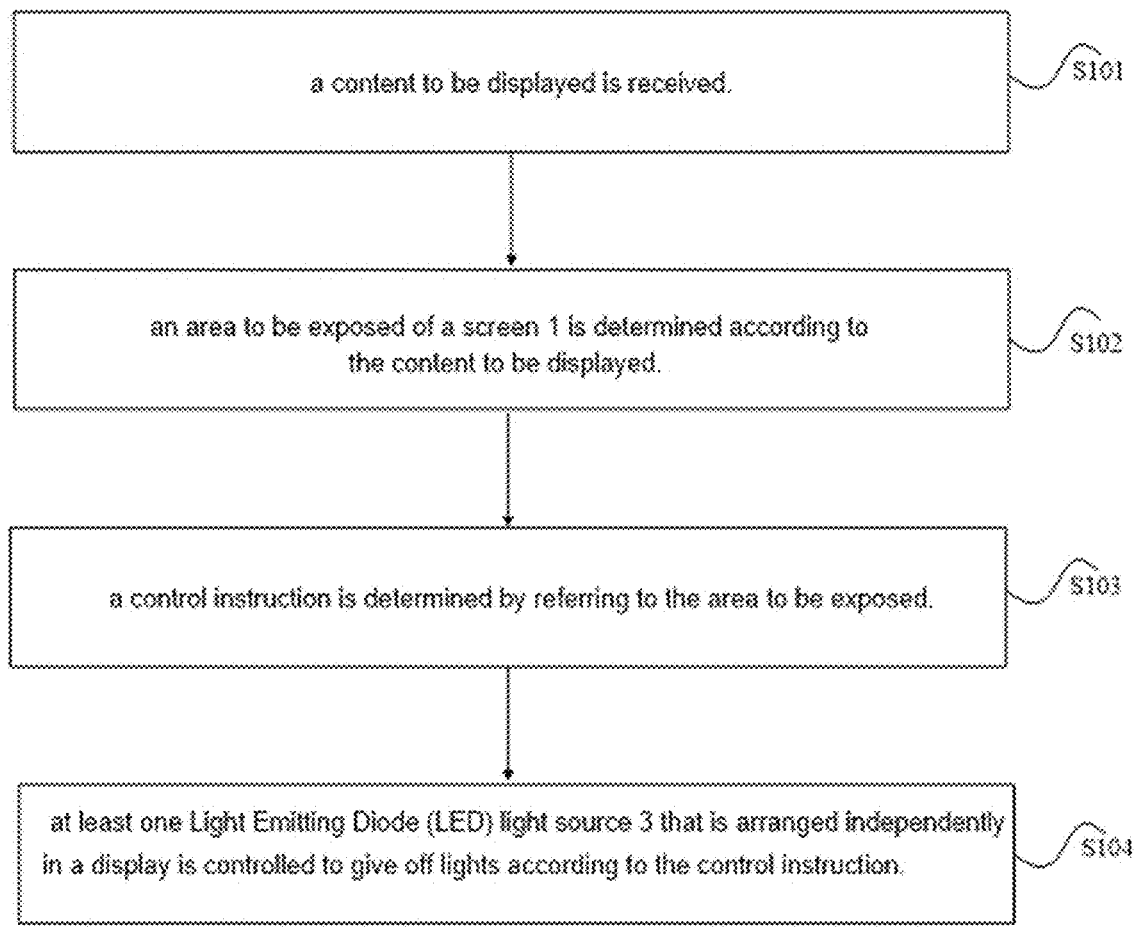
FIG. 8 is a schematic diagram illustrating a zone control method according to an embodiment of the disclosure.

As shown in FIG. 8, the disclosure further illustrates zone-controllable control methods. In an embodiment, the zone-controllable control method may include the following steps.

S101: a content to be displayed is received.

S102: an area of a screen 1 to be exposed is determined according to the content to be displayed.

S103: a control instruction is determined by referring to the area to be exposed.

S104: at least one LED light source 3 that is arranged independently in a display is controlled to emit light according to the control instruction.

As for processing of the overlapping area, a zone control method may be taken to process. When there are two overlapping light spots, as shown in FIG. 6, assuming that non-overlapping parts are A and B respectively and an overlapping part is C. A, B, and C are mutually disjoint (A∩B=0, A∩C=0, and B∩C=0). A light spot D is defined as A+C, which corresponds to a light source D. A light spot E is defined as B+C, which corresponds to a light source E.

When an exposed area is positioned in the area A, the light source D emits light.

When the exposed area is positioned in the area B, the light source E emits light.

When the exposed area is positioned in the area A and the area B, the light source D and the light source E emit light synchronously.

When the exposed area is positioned in the area A and the area C, the light source D emits light.

When the exposed area is positioned in the area B, and the area C, the light source E emits light.

When the exposed area is positioned in the area C, only one of the light source D and the light source E emits light.

When the exposed area is positioned in the area A, the area B, and the area C, the light source D and the light source E emit light synchronously, and the screen 1 may be in a semi-opened semi-closed gray status. The gray status has different modes of implementation on the different screens 1 and may be implemented by controlling a liquid crystal status or implementing time division multiplexing.

Figure 3:
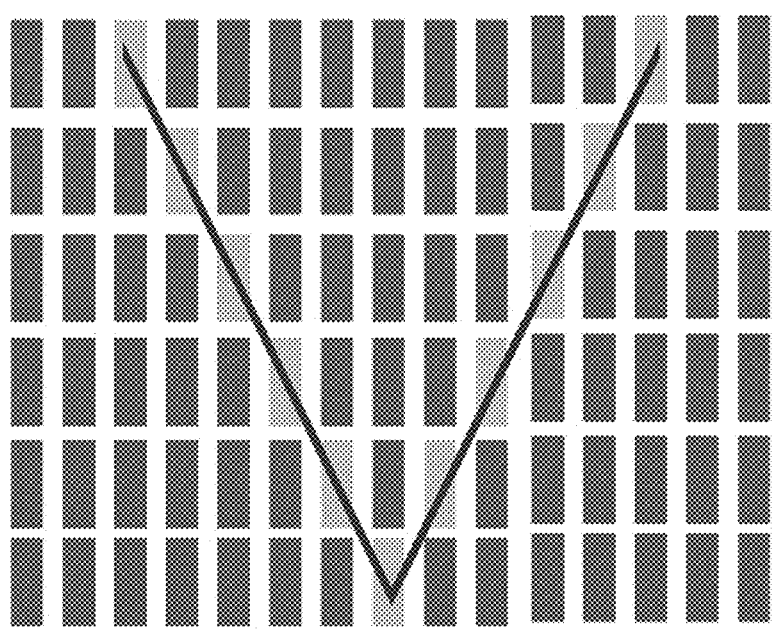
FIG. 3 is a schematic diagram illustrating a control status of an independent light source according to an embodiment of the disclosure.
Figure 4:
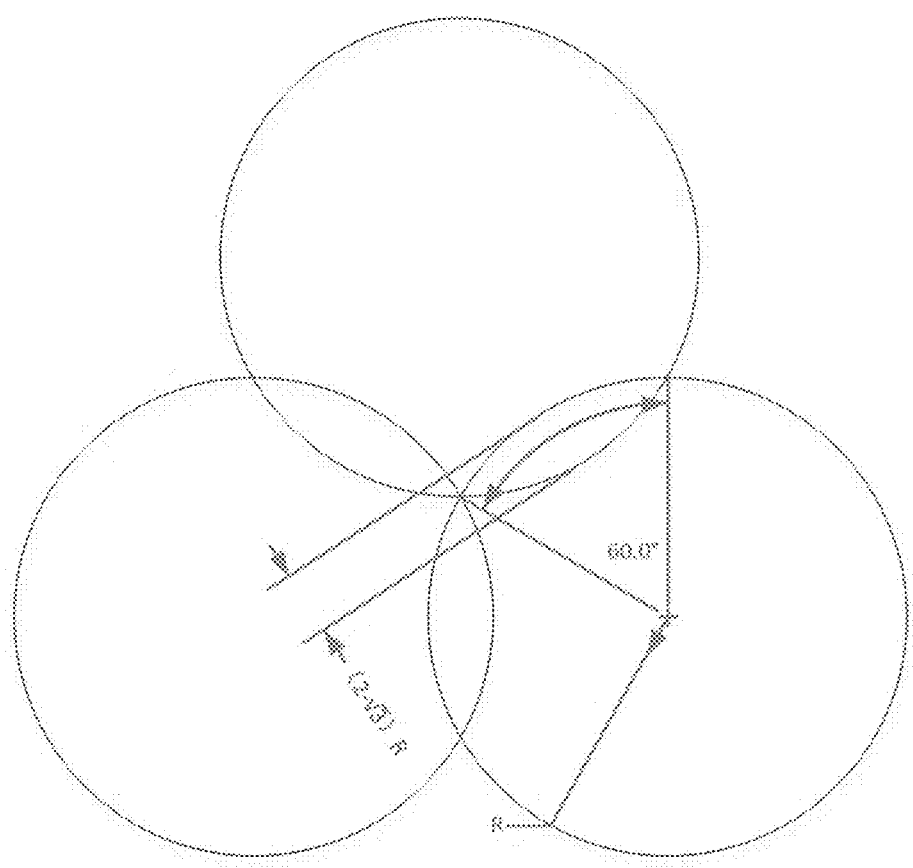
FIG. 4 is a zoning diagram illustrating a light source of a screen according to an embodiment of the disclosure.

The content to be displayed may include displayed point location information. By referring to the point location information, the area of the screen 1 to be exposed may be converted, and by referring to the area to be exposed, the control instruction may be determined (the control instruction may be determined by referring to the above situation). The above controlled lighting may be controlled by a controller 5 according to the control instruction. Each LED light source 3 may be independently controlled with a programmable logic device or a dedicated control device 5 (the controller 5). The LED light sources 3 may be arranged in the form of a matrix, a rhombus, a circle, a triangle, and other shapes according to the actual need of a 3D printer. Because the screen 1 is presented as the rectangle so far, the LED light sources 3 are arranged in the form of the rectangle. The different light sources may be controlled according to the need of exposing an image. As shown in FIG. 2, the independent light source may be arranged in the form of the matrix by the LED light sources 3. When a brown V-like shape as shown in FIG. 3 needs to be exposed, only the LEDs of a corresponding part under the V-like shape need to emit light, while other LEDs are kept in an OFF status. Not all LEDs are required to light up compared with the previous solutions. This way, fewer LEDs emit light, and less energy may be consumed. There is no light irradiating the other parts on the screen 1 as well, and no heat will be generated by these parts. As a result, the temperature of the screen 1 may be reduced, the service life of the screen 1 may be prolonged, and the power consumption may be effectively reduced.

Figure 9:
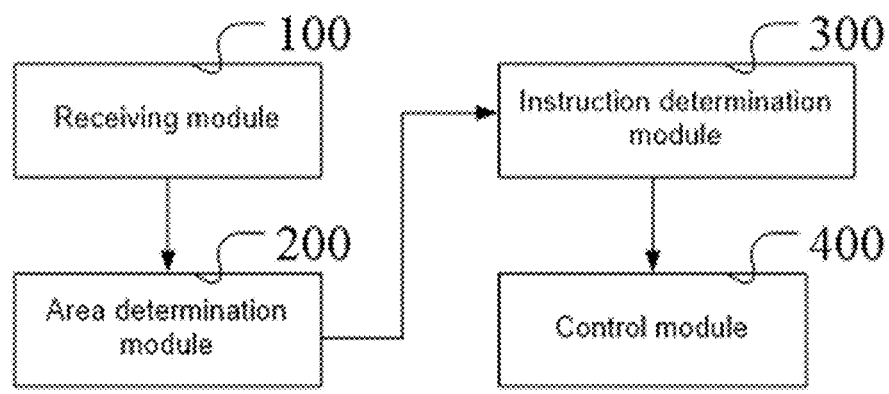
FIG. 9 is a schematic diagram illustrating a zone control device according to an embodiment of the disclosure.

As shown in FIG. 9, the application further relates to a zone-controllable control device, which may include a receiving module 100, an area determination module 200, an instruction determination module 300, and a control module 400.

The receiving module 100 may be configured to receive a content to be displayed.

The area determination module 200 may be configured to determine an area to be exposed of a screen 1 according to the content to be displayed.

The instruction determination module 300 may be configured to determine a control instruction by referring to the area to be exposed.

The control module 400 may be configured to control at least one LED light source 3 that is independently arranged in a display to emit light according to the control instruction.

As for processing of the overlapping area, a zone control method may be taken to process. When there are two overlapping light spots, as shown in FIG. 6, assuming that non-overlapping parts are A and B respectively and an overlapping part is C. A, B and C are mutually disjoint (A∩B=0, A∩C=0, and B∩C=0). A light spot D is defined as A+C, which corresponds to a light source D. A light spot E is defined as B+C, which corresponds to a light source E.

When an exposed area is positioned in the area A, the light source D emits light.

When the exposed area is positioned in the area B, the light source E emits light.

When the exposed area is positioned in the area A and the area B, the light source D and the light source E emit light synchronously.

When the exposed area is positioned in the area A and the area C, the light source D emits light.

When the exposed area is positioned in the area B, and the area C, the light source E emits light.

When the exposed area is positioned in the area C, only one of the light source D and the light source E emits light.

When the exposed area is positioned in the area A, the area B, and the area C, the light source D and the light source E emit light synchronously, and the screen 1 may be in a semi-opened semi-closed gray status. The gray status has different modes of implementation on the different screens 1 and may be implemented by controlling a liquid crystal status or implementing time division multiplexing.

The content to be displayed may include displayed point location information. By referring to the point location information, the area of the screen 1 to be exposed may be converted, and by referring to the area to be exposed, the control instruction may be determined (the control instruction may be determined by referring to the above situation). The above controlled lighting may be controlled by a controller 5 according to the control instruction. Each LED light source 3 may be independently controlled with a programmable logic device or a dedicated control device 5 (the controller 5). The LED light sources 3 may be arranged in the form of a matrix, a rhombus, a circle, a triangle, and other shapes according to the actual need of a 3D printer. Because the screen 1 is presented as the rectangle so far, the LED light sources 3 are arranged in the form of the rectangle. The different light sources may be controlled according to the need of exposing an image. As shown in FIG. 2, the independent light source is arranged in the form of the matrix by the LED light sources 3. When a brown V-like shape shown in FIG. 3 needs to be exposed, only the LEDs of a corresponding part under the V-like shape need to emit light, while other LEDs are kept in an OFF status. Not all LEDs are required to light up compared with the previous solutions. This way, fewer LEDs emit light, and less energy may be consumed. There is no light irradiating the other parts on the screen 1 as well, and no heat will be generated by these parts. As a result, the temperature of the screen 1 may be reduced, the service life of the screen 1 may be prolonged, and the power consumption may be effectively reduced.

The above are only the preferred embodiments of the application and are not intended to limit the application. For those skilled in the art, the application may have various modifications and variations. Any modifications, equivalent replacements, improvements and the like made within the spirit and principle of the application shall fall within the scope of protection of the application Various embodiment of the disclosure may have one or more of the following effects. In some embodiments, the disclosure may provide a light-curing printer display device, a 3D printer, a control method and device, and an electronic device, which may help to solve the problem that the exposure quality is poor. In other embodiments, the disclosure may help to solve technical problems in 3D printing technologies (e.g., stereolithography, digital light processing, selective laser sintering, additive manufacturing, fused filament fabrication, fused deposition modeling, etc.) such as the exposure quality being poor, the loss being great, and the service life being short.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The invention claimed is:

1. A light-curing printer display device, comprising:
a screen;
a light source assembly arranged on a back side of the screen,
the light source assembly comprising a plurality of Light Emitting Diode (LED) light sources independent of each other;
a shielding plate arranged between the screen and the light source assembly,
the shielding plate being provided with a plurality of light holes in the same quantity as the plurality of LED light sources, and
each of the plurality of light holes is arranged opposite to a corresponding LED light source; and
a controller electrically connected with the plurality of LED light sources,
the controller being configured to control at least one LED light source to emit light;
wherein:
a diameter of at least one of the plurality of light holes is $$\frac{H1}{H} \times 2R;$$

H1 is a first distance between an upper surface of the shielding plate and the plurality of LED light sources;
H is a second distance from the plurality of LED light sources to the screen;
R is a radius of a round light spot projected by at least one of the plurality of LED light sources through the at least one of the plurality of light holes; and
following constraint condition is satisfied:

$$H1 < \frac{\sqrt{3}}{2}H.$$

2. The light-curing printer display device in claim 1, wherein the light source assembly has a shape selected from the group consisting of a rectangle, a rhombus, a circle, and a triangle.

3. The light-curing printer display device in claim 1, wherein the at least one of the plurality of LED light sources is configured to:
receive a content to be displayed;
determine an area of the screen to be exposed according to the content to be displayed;
determine a control instruction by referring to the area of the screen to be exposed; and
control the at least one of the plurality of LED light sources to emit light according to the control instruction.

4. The light-curing printer display device in claim 1, wherein a distance between two adjacent light holes or two adjacent LED light sources is $\sqrt{3}R$.

5. The light-curing printer display device in claim 1, wherein:
the light source assembly has a rectangular shape; and
the light source assembly comprises twenty-two LED light sources independent of each other.

6. A 3-dimensional (3D) printer, comprising the light-curing printer display device of claim 1.

7. A 3D printer comprising a light-curing printer display device, the light-curing printer display device comprising:
a screen;
a light source assembly arranged on a back side of the screen,
the light source assembly comprising a plurality of Light Emitting Diode (LED) light sources independent of each other; and
a shielding plate arranged between the screen and the light source assembly,
the shielding plate being provided with a plurality of light holes in the same quantity number as that of the plurality of LED light sources, and
each of the plurality of light holes is arranged opposite to a corresponding LED light source;
wherein:
a diameter of at least one of the plurality of light holes is $H1/H \times 2R$;
H1 is a first distance between an upper surface of the shielding plate and the plurality of LED light sources;
H is a second distance from the plurality of LED light sources to the screen;
R is a radius of a round light spot projected by at least one of the plurality of LED light sources through the at least one of the plurality of light holes; and
following constraint condition is satisfied: $H1 < \sqrt{3}/2H$.

8. The 3D printer in claim 7, wherein the light source assembly has a shape selected from the group consisting of a rectangle, a rhombus, a circle, and a triangle.

9. The 3D printer in claim 7, wherein the at least one of the plurality of LED light sources is configured to:
receive a content to be displayed;
determine an area of the screen to be exposed according to the content to be displayed;
determine a control instruction by referring to the area of the screen to be exposed; and
control the at least one of the plurality of LED light sources to emit light according to the control instruction.

10. The 3D printer in claim 7, wherein a distance between two adjacent light holes or two adjacent LED light sources is $\sqrt{3}R$.

11. The 3D printer in claim 7, wherein:
the light source assembly has a rectangular shape; and
the light source assembly comprises twenty-two LED light sources independent of each other.

\* \* \* \* \*